United States Patent [19]

McClaran

[11] Patent Number: 4,742,843
[45] Date of Patent: May 10, 1988

[54] AIR AND VACUUM RELIEF VALVE

[75] Inventor: Mark R. McClaran, Orange, Calif.

[73] Assignee: Rain Bird Sprinkler Mfg. Corp., Glendora, Calif.

[21] Appl. No.: 86,976

[22] Filed: Aug. 19, 1987

[51] Int. Cl.[4] .............................................. F16K 31/22
[52] U.S. Cl. .................................... 137/202; 137/433; 137/390
[58] Field of Search ............... 137/202, 192, 433, 390; 73/322.5

[56] References Cited

U.S. PATENT DOCUMENTS 1,049,992  1/1913  Catchings ............................ 137/202
4,163,456  8/1979  Herron ................................ 137/202

OTHER PUBLICATIONS

Brochure entitled Air and Vacuum Relief Valves, distrubuted by Rain Bird Sales, Inc. (4 pgs.).
Brochure-Waterman Industries, Inc. relating to "Red Top Air Vents and Vacuum Relief Valves" and "Ag Vent Ball Air and Vacuum Valves-Models 200, 300, 400" (4 pgs.).
Brochure-Bermad, disclosing model number 4405, 4420, and 4415, Air and Vacuum Relief Valves (4 pgs.).

Primary Examiner—Alan Cohan
Attorney, Agent, or Firm—Kelly, Bauersfeld & Lowry

[57] ABSTRACT

An air and vacuum relief value having a cylindrical housing defining a chamber and an aerodynamically shaped float body disposed for movement within said chamber between a lower, open position and an upper closed position, the float body having a generally inverted pear-shape configuration to prevent premature valve closure.

12 Claims, 1 Drawing Sheet

U.S. Patent May 10, 1988 4,742,843
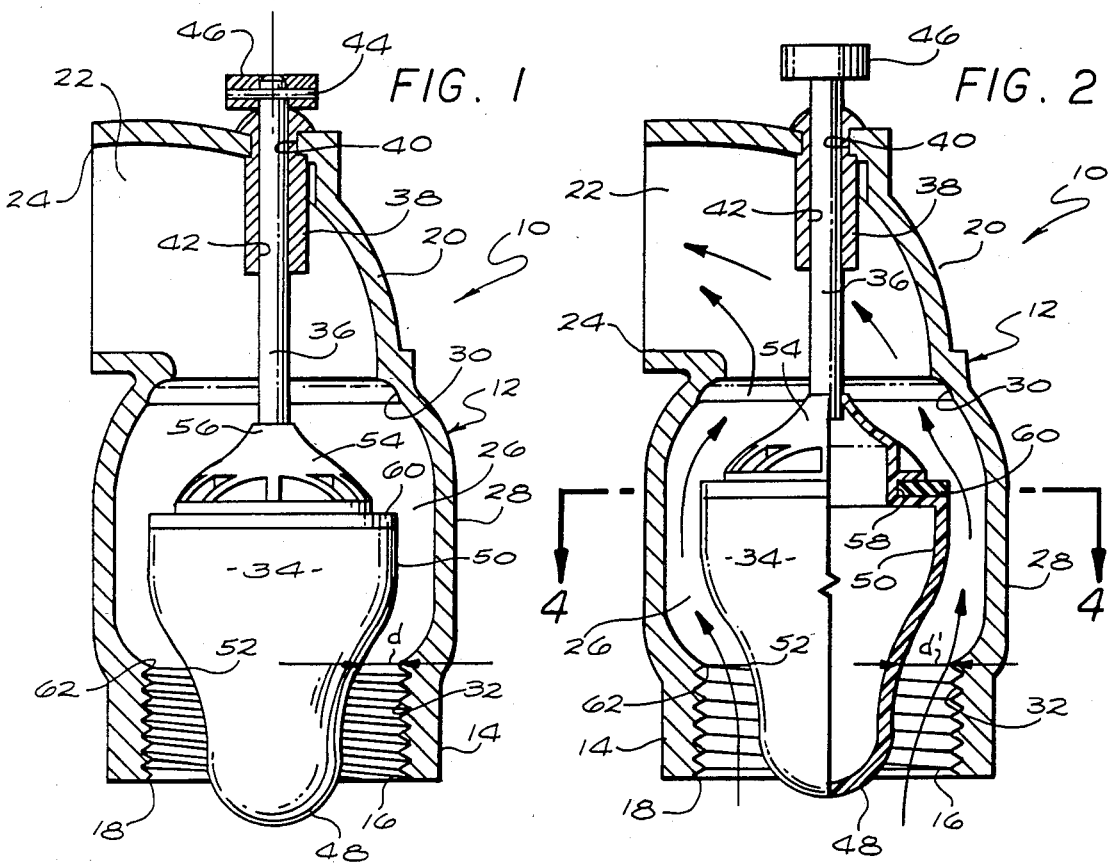
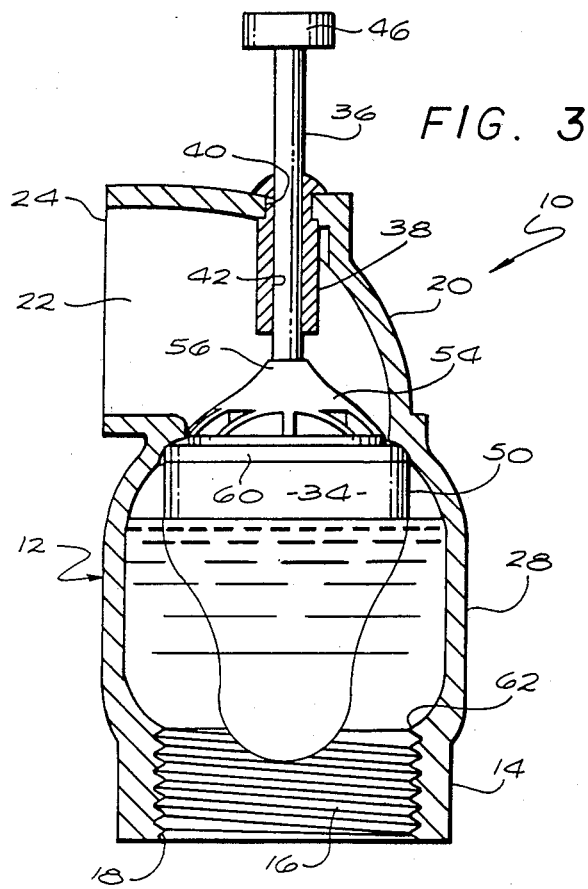
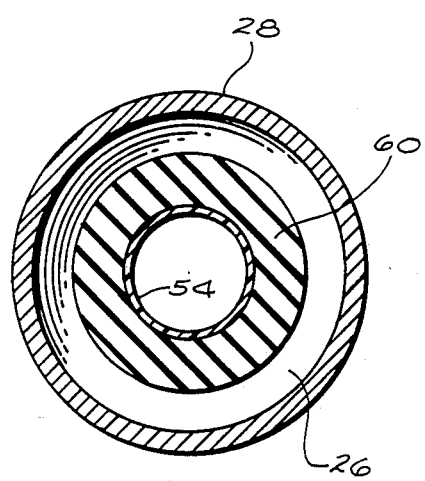

AIR AND VACUUM RELIEF VALVE

BACKGROUND OF THE INVENTION

This invention relates to air and vacuum relief valves, and more particularly to a new and improved air and vacuum relief valve primarily intended for use in venting air to and from an irrigation water supply line.

In many pressurized water supply lines such as, for example, those used in irrigation, it is highly desirable to prevent the formation of air blocks in the line by venting air from the line during filling of the system. On draining of the system, it may also be desirable to vent air back into the supply line to prevent the formation of a vacuum in the line which could cause the line to collapse.

Various air vent and vacuum relief valves have been proposed in the prior art to protect against air blockage and vacuum collapse of a water supply line. Typically such prior art valves include a housing connected to the high point of the water supply line and within which is mounted a cylindrical or spherical float body. On filling of the line, air is vented from the line through the valve until water enters the housing and raises the float body to close the valve. On draining of the line, water within the housing recedes, causing the float body to drop and open the valve for admitting air back into the line.

While such prior art valves have met with some degree of commercial success, none has been totally satisfactory. One significant problem that has been encountered is that of pre-mature valve closure caused by high air flow rates through the valve on line filling. In many prior art valves, the float body is relatively light in weight and has a right cylindrical or spherical shape presenting a relatively high coefficient of drag. With such float bodies, high air flow rates through the valve may prematurely lift the float body and close the valve before all air has been vented from the supply line. Although attempts have been made to design a valve that will not prematurely close due to high flow rates, such as valves have typically required baffles and shields which are expensive to manufacture and complex in design.

Thus, there exists a need for a reliable and effective air and vacuum relief valve which is simple in design and economical to manufacture yet which will not prematurely close in the presence of high air flow rates through the valve. As will become more apparent hereinafter, the present invention satisfies this need.

SUMMARY OF THE INVENTION

The present invention provides a new and improved float body for an air and vacuum relief valve which is formed with an aerodynamically improved shape to reduce its coefficient of drag and which cooperates with the valve housing to operate in a highly reliable manner to insure proper valve closure once all air has been vented from the supply line, yet prevents premature valve closure as a result of high air flow rates through the valve. Moreover, the float body of the present invention is relatively economical to manufacture and simple in design, yet is very effective in operation.

The float body is formed as a hollow, generally inverted pear-shaped shell with a lower, relatively small diameter bulbous nose portion and an upper, generally cylindrical portion of larger diameter joined with the lower portion by a downwardly and inwardly contoured smooth sidewall. The float body is supported for vertical movement within a housing chamber by a vertical shaft which is dimensioned to support the float body in the fully open position such that the smallest area passageway through which air moves from the valve inlet to the outlet is adjacent the chamber inlet and opposite the contoured sidewall. With this arrangement, any tendency for the air flowing through the valve body to raise the float due to passing through the construction will result in lifting of the float and an increase in the size of the constructing passageway, thereby reducing the lifting effect and arresting upward movement of the float.

Moreover, due to the shape of the float body, the float body has a relatively large buoyancy thereby permitting weight to be added to the float to further inhibit premature closing due to high air flow rates while insuring that proper and effective valve closure takes place upon water entering the chamber. By increasing the buoyancy and effective weight of the float body, and tendency of the valve to stick in the closed position is also eliminated.

Various other features and advantages of the present invention will become more apparent from the following detailed description taken in conjunction with the drawings which disclose, by way of example the principles of this invention.

DESCRIPTION OF THE DRAWINGS

FIG. 1 is a side elevational view, partly in cross-section of an air and vacuum relief valve embodying the principles of the present invention and showing the valve in the open position;

FIG. 2 is a side elevational view similar to FIG. 1 with additional parts shown in cut-away cross-section and illustrating the valve in a different, intermediate position;

FIG. 3 is a side elevational view similar to FIG. 1, but showing the valve in the closed position; and FIG. 4 is a sectional view taken substantially along the line 4—4 of FIG. 2.

DETAILED DESCRIPTION OF PREFERRED EMBODIMENT

As shown in the exemplary drawings, the present invention is embodied in a new and improved air and vacuum relief valve 10 primarily intended for use in preventing air blocks and vacuum formation in a pressurized water supply line. Typically, such valves 10 are placed at the high point of a water supply line (not shown) such as those used in irrigation water supply systems to vent air from the line on initial filling, and to permit air flow back into the line upon draining.

In this instance, the valve 10 includes a tubular housing 12, preferably formed of cast metal, having a lower portion 14 defining an inlet passageway 16 with a bottom inlet opening 18, and an upper portion 20 forming an outlet passageway 22 with the laterally directed outlet opening 24. A central cylindrical chamber 26 is formed between the inlet passageway 16 and the outlet passageway 22 by an enlarged diameter housing central portion 28, and a valve seat 30 is formed between the upper end of the chamber and the outlet passageway. The lower portion 14 of the housing 12 is herein formed with internal threads 32 for coupling the valve 10 to a supply line, the supply line typically having a short vertical riser pipe (not shown) projecting from its upper sidewall for permitting fluid to communicate between the valve and the supply line.

Disposed concentrically with the chamber 26 is a float body 34 coupled to a shaft 36 projecting upwardly through the upper portion 20 of the housing 12 to a position outside the housing. The float 34 is supported by the shaft 36 for limited vertical movement between a lower, fully open position as shown in FIG. 1, and an upper closed position as shown in FIG. 3.

The shaft 36 herein is slidably supported by a cylindrical guide bearing 38 secured in a hole 40 through the housing 12, the guide bearing having a central bore 42 which slidably engages the shaft to support and guide the shaft during movement of the float 34. Attached to the upper end of the shaft 36, herein by a transverse pin 44, is a knob shaped weight 46 which functions to limit downward movement of the shaft by abutting against the upper and the guide bearing 38, and to bias the float 34 toward the open position, and to assist in resisting lift generated by high air flow rates tending to prematurely close the valve.

In accordance with the present invention, the float 34 is formed to have an aerodynamically improved shape to reduce its drag coefficient in the presence of air flow between the inlet 18 and the outlet 24, and cooperates with the housing 23 to operate in a highly reliable manner to insure proper closure of the valve 10 while preventing premature valve closure as a result of high flow rates through the housing. Moreover, the float 34 is relatively simple in design and economical to manufacture yet is highly effective in use.

Toward the foregoing ends, the float 34 is formed as a hollow, air tight shell having the general shape of an inverted pear with a lower, relatively small diameter bulbous nose portion 48 and an upper cylindrical portion 50 of larger diameter joined with the lower portion by a generally smooth, downwardly and inwardly contoured sidewall portion 52. Preferably, the float 34 is formed of several molded plastic sections which are then welded or otherwise bonded together to form the airtight shell with air filling the internal volume of the float.

Attached in overlying relation to the upper end of the upper portion 50 of the float 34 is a generally inverted cup-shaped cap 54 of reduced diameter having a centrally disposed upstanding boss 56 to which the lower end of the stem 36 is secured. As can best be seen in the sectional portion of FIG. 2, the cap 54 and upper end of the upper portion 50 of the float 34 are formed to define a circumferential groove 58 into which is snap-fit a toridal shaped seal gasket 60 whose external diameter is generally the same as that of the upper portion. Preferably, the seal gasket 60. is made of elastomeric material, and operates to seat against the valve seat 30 and form a fluid tight seal when the float is in the closed position.

Importantly, the length of the shaft 36 is selected such that when the valve 10 is in the fully open position with the weight 46 stopped against the top of the guide bearing 36, the float is positioned with the bulbous nose portion 48 extending into the inlet passageway 16 and the contoured sidewall portion 52 disposed adjacent the internal junction 62 of the housing lower portion 14 and housing central position 28. In this portion, a restrictive annular space designated generally "d" is defined between the contoured sidewall portion 52 and the internal junction 62, and through which air must initially pass from the inlet 18 to the chamber 26.

During high air flow conditions as may occur on rapid filling of the supply line, air flowing through the restrictive annulus "d" may tend to lift the float 34 toward the closed position. However, as can be seen in FIG. 2, premature lifting of the float 34 will result in an increase in the size of the annular space "d'", thereby reducing the air throttling effect and, hence, the tendency of the air to further lift the float. In this manner, any tendency for high air flow rates to permaturely lift the float 34 and close the valve 10 is significantly reduced. Moreover, the improved aerodynamic shape of the float 34 and the downward bias of the weight 46 further reduce the tendency of the float to prematurely lift in the presence of high air flow rates. With these factors coupled together, the valve 10 is substantially prevented from premature closure due to high air flow rates through the housing 12.

Once all undesireable air has been exhausted through the outlet 24, water from the supply line will rise through the inlet passageway 16 into the chamber 26. Due to the buoyancy of the float 34, as the water level within the chamber 26 rises, the float 34 also rises against the bias of the weight 46 until the seal gasket 60 engages the valve seat 30 and seals off the chamber from the outlet passageway 22, as can be seen in FIG. 3. On draining of the supply line, water recedes from the chamber 26 permitting the float 34 to move downwardly under the bias of the weight 46, thereby opening the valve 10 and permitting air to bleed back into the supply line.

Thus, the present invention provides a new and improved air and vacuum relief valve 10 which substantially eliminates the problem of premature valve closure due to the high air flow rates through the valve. Moreover, due to the relatively high buoyancy of the float body 34, increased weight can be used to bias the float toward the open position thereby insuring that the float will not stick in the closed position and to assist in resisting lift generated by high air flow rates tending to prematurely close the valve, yet without impairing proper valve operation.

While a particular form of the present invention has been herein illustrated, and described, it will be apparent that various modifications can be made without departing from the spirit and scope of this invention.

I claim:

1. In an air and vacuum relief valve of the type including:
   a housing having a bottom inlet passageway and a vertically spaced outlet passageway;
   a chamber within said housing between said inlet passageway and said outlet passageway;
   an entrance from said inlet passageway to said chamber; and
   a float body centrally disposed within said chamber and supported for movement between a lower, open position and an upper, closed position closing said outlet passageway, the improvement comprising:
   said float body being formed as a hollow, air tight shell having the general shape of an inverted pear with a lower, relatively small diameter bulbous nose portion and an upper cylindrical portion of larger diameter joined with said lower portion by a smooth, downwardly and inwardly contoured sidewall portion.

2. The improvement as set forth in claim 1 wherein said float body is supported with said lower portion projecting into said inlet passageway when said float is in said open position.

3. The improvement as set forth in claim 2 wherein said float body is supported by a weighted stem projecting upwardly from said float and extending through said housing.

4. The improvement as set forth in claim 3 when said float body is formed of molded plastic.

5. The improvement as set forth in claim 2 wherein said float body includes a seal gasket concentrically mounted in overlying relation to said upper cylindrical portion.

6. The improvement as set forth in claim 1 wherein said float body includes a cap portion overlying said upper portion and a toroidal shaped seal gasket concentrically disposed between said cap portion and said upper portion, said seal gasket having an external diameter generally the same as that of said upper portion.

7. The improvement as set forth in claim 6 wherein said float body is supported by a stem projecting upwardly from said cap portion and extending through said housing, said lower portion of said float body being disposed within said inlet passageway and said contoured sidewall portion adjacent said entrance when said float body is in said open position.

8. The improvement as set forth in claim 7 wherein said stem includes a weight attached thereto.

9. In an air and vacuum relief valve of the type comprising:
   a cylindrical housing having a bottom inlet passageway and a vertically spaced outlet passageway;
   an enlarged diameter chamber within said housing between said inlet passageway and said outlet passageway;
   an entrance from said inlet passageway to said chamber;
   a valve seat formed between said chamber and said outlet passageway; and
   a float body centrally disposed within said chamber and supported for movement between a lower, open position and an upper, closed position closing said outlet passageway, the improvement comprising: said float body being formed as a hollow, air tight plastic shell of circular horizontal cross-section having a lower, relatively small diameter bulbous nose portion projecting into said inlet passageway when said float body is in said open position; and an upper cylindrical portion of larger diameter joined with said lower portion by a smooth downwardly and inwardly contoured sidewall portion, said contoured sidewall portion being disposed adjacent said entrance when said float body is in said open position and forming with said entrance a constricted annulus to said chamber through which fluid must pass from said inlet passageway to said outlet passageway.

10. The improvement as set forth in claim 9 wherein said float body includes a cap portion overlying said cylindrical portion and is supported by a vertically projecting shaft extending from said cap portion through said housing.

11. The improvement as set forth in claim 10 wherein said float body includes an annular seal gasket disposed concentrically between said cylindrical portion and said cap portion, said seal gasket adapted to mate with said valve seat when said float body is in said closed position to close said outlet passageway.

12. The improvement as set forth in claim 1 wherein said stem includes a weight attached thereto.

* * * * *